Figure 1:
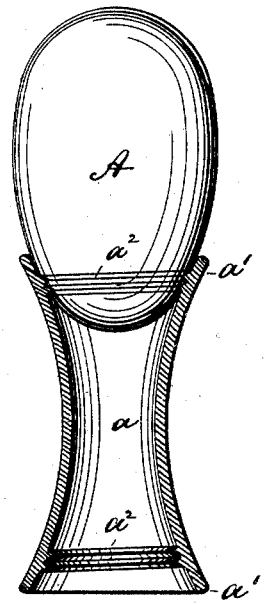

(No Model.)

C. MICHEL.
EGG CUTTER.

No. 503,431. Patented Aug. 15, 1893.

WITNESSES:
A. Schehl.
Wm. Schulz.

INVENTOR
Charles Michel
BY Roeder & Briesen
ATTORNEYS.

UNITED STATES PATENT OFFICE.

CHARLES MICHEL, OF NEW YORK, N. Y.

EGG-CUTTER.

SPECIFICATION forming part of Letters Patent No. 503,431, dated August 15, 1893.

Application filed April 12, 1893. Serial No. 470,077. (No model.)

*To all whom it may concern:*

Be it known that I, CHARLES MICHEL, of New York city, New York, have invented an Improved Egg-Cutter, of which the following is a specification.

This invention relates to a device for cutting through the shell tips of boiled eggs to prepare the eggs for eating. It is a familiar fact that in so removing the tips of eggs with a cutting edge of any kind some care must be exercised to prevent the cutting instrument penetrating too far into the egg, whereby its contents are spilled in an unsightly manner. Devices have been invented which take the place of the ordinary means for removing the tip of the egg, viz:—the edge of a knife or spoon aimed to strike the egg in the desired place, but in all these devices, so far as I am aware, the force or pressure required for severing the tip has still been a matter of judgment on the part of the operator, so that care had yet to be exercised lest the pressure, while great enough to cut the shell, should not be so great as to spill the meat of the egg. The fact that the thickness and character of an egg shell are uncertain quantities renders it still more important, if possible, in order to produce a successful egg-cutter, to eliminate from the device this factor of individual judgment on the part of the operator, and this is one object of my invention.

A second defect which my invention is intended to remedy is that in all egg-cutters hitherto invented, so far as I am aware, there are movable parts, which, moving relatively to each other, produce the necessary degree of pressure or force to accomplish the cutting. Movable parts imply pivots or similar methods of juncture, and for this reason egg-cutters thus constructed, liable as they are to be covered with spilled food, which is difficult to completely remove on account of the joints, pivots, or similar junctures, are apt to become offensive, or at least require more trouble to keep them clean than the advantage of using them is worth. The second object of my invention then is to produce an egg-cutter in which there shall be no movable parts.

Another object of my invention is as follows:—In all egg-cutters hitherto devised, so far as I am aware, the egg is supported by a circular grasping edge or ring while the cutting edge is carried on said support and acts on the egg at some distance from the supporting edge. This is very inconvenient with eggs of different sizes, as will be readily understood, since either the grasping portion had to be made variable in size to suit different sizes of eggs, which necessitated expense in construction, or the distance between the holding portion and the cutting portion had to be made variable, to which the same objection held. It therefore occurred to me that it would be a decided improvement to devise an egg-cutter in which the cutting portion should itself be the grasping or holding portion, and this I have succeeded in doing in my device.

Other advantages incidentally attained by my invention as perfected are simplicity of structure and economy of manufacture.

Figure 2:
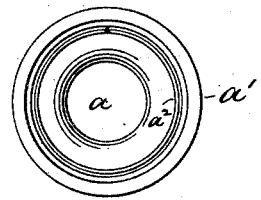

In the accompanying drawings, Figure 1 is a longitudinal section of my improved egg cutter; Fig. 2 a top view of the same.

The letter $a$, represents the tubular body or shell of the cutter, provided with one or two outwardly curved flaring or enlarged ends $a'$, adapted to receive the tip of an egg. Within each of the flaring ends $a'$, there is contained an inner spiral knife edge or cutting tool $a^2$, made with one or more convolutions.

In use, the egg A, is inserted with its tip into one of the flaring ends $a'$, and is revolved, to sever the shell in a circular line around the tip. It will be seen that by the use of the spiral circumferential cutting edge, the shell of the egg is gradually attacked and the incision gradually deepened, so that the shell is detached without being cracked and also without cutting into the meat.

It will be seen that no nicety of judgment or care on the part of the person using the egg-cutter is required as to the degree of pressure or force necessary for breaking or cutting the shell, since the shell is not cut by force applied directly by the operator but indirectly by the gradual contraction of the cutting edge as the shell is rotated. As the amount of this contraction is very small compared with the distance through which the egg is rotated, the care or skill necessary to neatly cut the tip is reduced in the same proportion.

What I claim is—

1. An egg-cutter having a helical cutting edge immovably secured thereto, substantially as described.

2. An egg-cutter having immovably secured thereto an internal helical cutting edge, adapted to receive the end of an egg within said helix, substantially as described.

3. An egg-cutter having a cutting edge of a configuration to encompass the egg and contact with it all round, all the parts being fixed relatively to each other, substantially as described.

CHARLES MICHEL.

Witnesses:
WM. SCHULZ,
F. V. BRIESEN.